US006067060A

United States Patent [19]

Benoit et al.

[11] Patent Number: 6,067,060

[45] Date of Patent: May 23, 2000

[54] METHOD FOR THE CONTROL OF AN IMAGE DISPLAY SCREEN DISPLAYING HALF-TONES AND DISPLAY DEVICE IMPLEMENTING THE METHOD

[75] Inventors: Eric Benoit, Eybens; Philippe Zorzan, Grenoble, both of France

[73] Assignees: Thomson-CSF, Paris; Thomson Multimedia, Courbevoie, both of France

[21] Appl. No.: 08/803,280

[22] Filed: Feb. 20, 1997

[30] Foreign Application Priority Data

Feb. 27, 1996 [FR] France .................................. 96 02393

[51] Int. Cl.[7] ...................................................... G06F 17/30

[52] U.S. Cl. ............................ 345/60; 345/211; 345/212; 345/63; 345/77; 345/89; 345/147

[58] Field of Search ............................. 345/60, 211, 212, 345/63, 77, 89, 147

[56] References Cited

U.S. PATENT DOCUMENTS

| | | | |
|---|---|---|---|
| 5,055,833 | 10/1991 | Hehlen et al. | 340/784 |
| 5,233,340 | 8/1993 | Yamaguchi et al. | 340/793 |
| 5,302,966 | 4/1994 | Stewart | 345/76 |
| 5,729,243 | 3/1998 | Cavallerano et al. | 345/59 |
| 5,751,264 | 5/1998 | Cavallerano et al. | 345/85 |
| 5,864,328 | 1/1999 | Kajimoto | 345/95 |

FOREIGN PATENT DOCUMENTS

| | | |
|---|---|---|
| 0 306 011 | 3/1989 | European Pat. Off. . |
| WO 94/09473 | 4/1994 | WIPO . |
| WO 95/27971 | 10/1995 | WIPO . |

OTHER PUBLICATIONS

Baldwin et al., Display Device, PCT International Publication #WO 94/09473, pp. 1–60, Apr. 28, 1994.

*Primary Examiner*—Thomas G. Black
*Assistant Examiner*—William Trinh
*Attorney, Agent, or Firm*—Oblon, Spivak, McClelland, Maier & Neustadt, P.C.

[57] ABSTRACT

Disclosed are a method for the control of an image display screen displaying half-tones and a display device implementing this method. The disclosed method is used to control an image display screen of the type having cells arranged in rows and columns and working either in a state known as an "OFF" state or in a state known as an "ON" state in which they are activated and produce light. The method consists in activating the cells of each row during sub-periods of different duration, with orders of distribution of the sub-periods that are different between two successive rows. This results in a reduction of the amplitude of the variations of a load constituted by the cells in the <<lit>> state of these two consecutive rows. Application inter alia to alternating plasma panels.

14 Claims, 5 Drawing Sheets

FIG.2a (Y1) PRIOR ART

FIG.2b (Y2) PRIOR ART

FIG.2c (Y3) PRIOR ART

FIG.2d (Y4) PRIOR ART

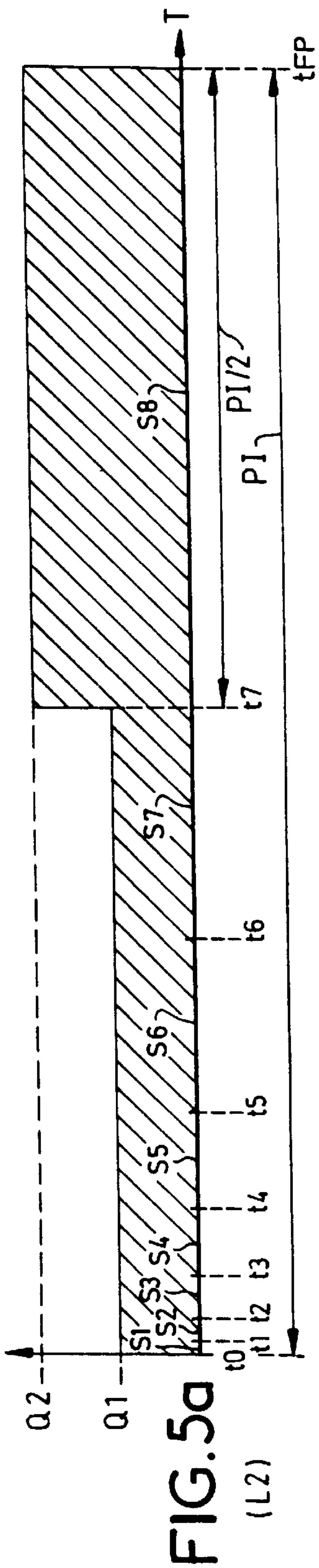
FIG.5a (L2)
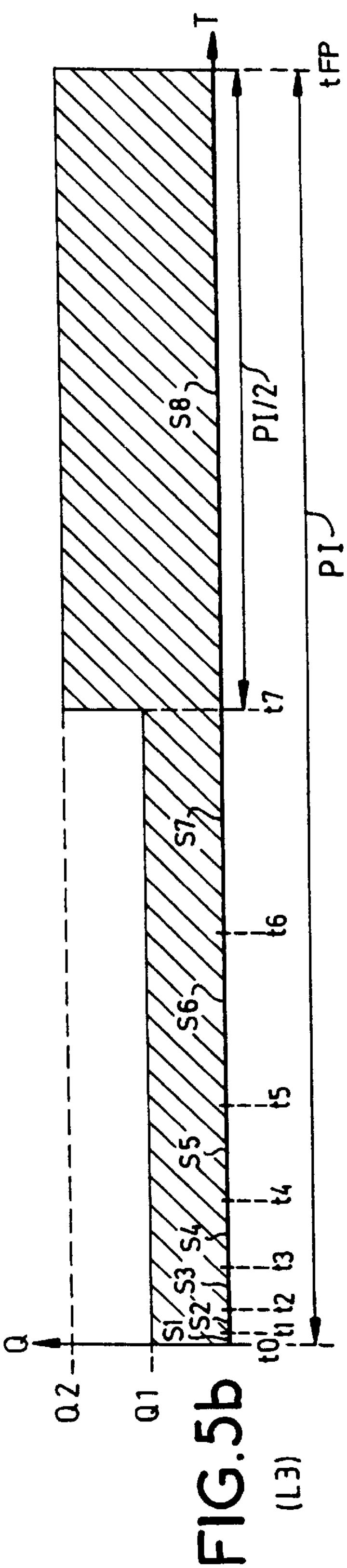
FIG.5b (L3)
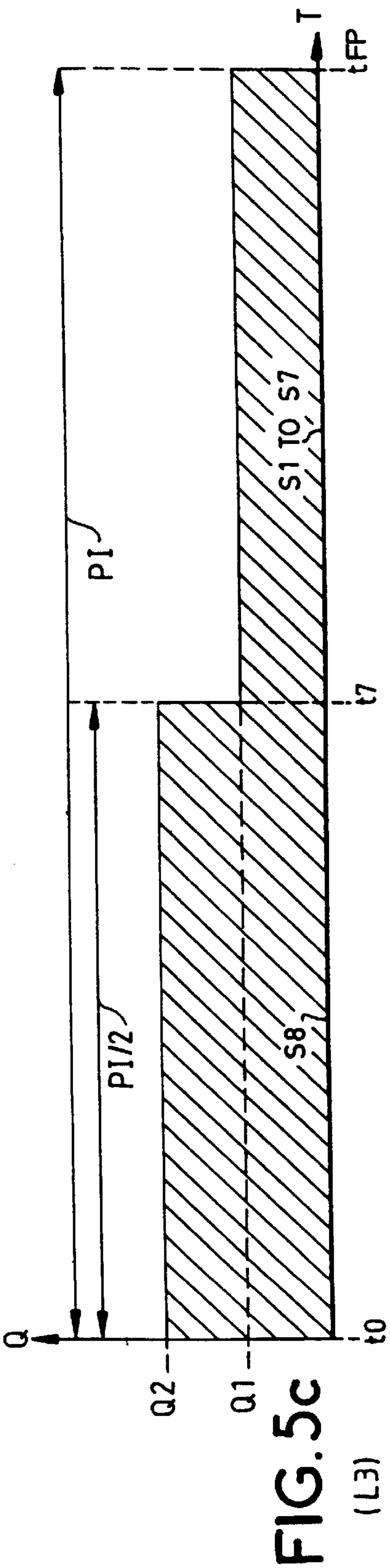
FIG.5c (L3)

METHOD FOR THE CONTROL OF AN IMAGE DISPLAY SCREEN DISPLAYING HALF-TONES AND DISPLAY DEVICE IMPLEMENTING THE METHOD

BACKGROUND OF THE INVENTION

1. Field of the Invention

The present invention relates to a method for the control of image display screens displaying half-tones. It can be applied to screens for which the pixels or pixels are cells working with two stable states and having a memory effect, and more particularly when the half-tones of the image are obtained by a modulation of the duration of light emission. The invention also relates to an image display device implementing the method.

The term <<memory effect>> is understood to mean the effect by which cells maintain either of two stable states when a signal having activated this state has disappeared.

2. Description of the Prior Art

Display screens of this kind are constituted for example by plasma panels (abbreviated as PP) of the direct current type with memory, or the alternating current type, or again for example by screens whose elementary cells use a "point effect" phenomenon so that each one of them produces an electron beam.

For example plasma panels (PP) flat screen display devices that work on the principle of an electrical discharge in the gases. PPs generally have two insulating slabs demarcating a gap-filled space. The slabs bear one or more arrays of intersecting electrodes.

Each intersection of electrodes defines a cell that corresponds to a small gaseous space. In each gaseous space, electrical discharges may be prompted in each of these spaces by the application of appropriate voltages to the two corresponding intersecting electrodes.

In direct current type PPs, the discharge current always takes place in the same direction unlike the alternating type PPs whose operation is based on an excitation of the electrodes in alternating mode.

In the case of alternating type PPs, the electrodes are covered with a dielectric material in such a way that since they are not in contact with the gas, electrical charges collect on the dielectric at each discharge in the gas.

These charges persist at the end of the discharge and their presence in a cell then makes it possible to prompt a discharge in this cell by the application of a voltage lower than that which will be necessary in the absence of these charges. This constitutes the "memory effect" already referred to. The cells that possess such charges are said to be in the "lit" or ON state. The other cells which require higher voltage to produce a discharge are said to be in the "extinguished" or OFF state.

This memory effect is used by means of alternating signals called sustaining signals, applied to all the cells to activate those that are in the "ON" state, namely to prompt so-called sustaining discharges in these cells that produce light without modifying their "ON" state or modifying the state of the cells that are in the "OFF" state.

All the so-called "alternating" PPs benefit from the above-described memory effect.

Certain alternating PPs use only two intersecting electrodes to define and activate a cell, as described for example in the French patent published under No. 2 417 848. In this case, the two intersecting electrodes are used to obtain both the addressing operation (namely the placing of the cell in the "ON" or the "OFF" state) and the sustaining discharges.

Reference may also be made to the <<coplanar sustaining>> type of alternating PPs, such as those known especially in the European patent document EP-A-0 135 382. In these PPs, each cell is defined at the intersection between a so-called addressing electrode and a pair of parallel electrodes. The sustaining discharges are carried out by means of the two parallel electrodes and the addressing is done by means of one of these two electrodes and the addressing electrode.

In the different types of PPs which show a memory effect, all the cells are supplied in parallel. The large number of cells possible may therefore lead to high currents and the supply of the cells may then show defects that generate defects of the image.

The authors of the invention have thought that the defects in the supply of the cells, due in particular to amplifiers working at the limits of their characteristics, are aggravated by the principle of the control of the half-tone of the image.

Indeed, the elementary cell of a PP has only two states: the "ON" state and the "OFF" state. Since it is not possible to have a similar modulation of the quantity of light emitted by a pixel, namely by a cell, the production of the half-tones is obtained by modulating the period of emission of light from the pixels in an image period, or in other words by modulating the time during which the cell is placed in the "ON" state within the image period.

The control and supply of the cells of a PP are explained here below.

FIG. 1 gives a schematic view of an alternating PP. To simplify the description, this PP is of the type with two intersecting electrodes to define a cell as described in the French patent No. 2 417 848 referred to further above.

The PP has an array of electrodes Y1 to Y4 called "row electrodes" intersecting with a second array of electrodes called "column electrodes" X1 to X4. Each intersection of row and column electrodes corresponds to a cell C1 to C16. These cells are thus arranged in rows L1 to L4 and in columns, CL1 to CL4.

Each row electrodes Y1 to Y4 is connected to an output circuit SY1 to SY4 of a row control device 1 and each column electrode C1 to C4 is connected to an output circuit SX1 to SX4 of a column control device 2.

The working of these two control devices 1, 2 is managed by an image management device 3.

Each output SY1 to SY4 of the row control device 1 delivers voltage square-wave signals that form the above-mentioned sustaining signals. These sustaining signals are thus applied simultaneously to all the row electrodes Y1 to Y4.

FIGS. 2*a* to 2*d* show sustaining signals applied respectively to the row electrodes Y1 to Y4. FIG. 2*a* particularly shows that the sustaining signals are formed by a succession of voltage square-wave signals set up on either side of a reference potential Vo which is often the potential of the ground. These square-wave signals vary between a negative potential V1 where they show one plateau and a positive potential V2 where they show another plateau. The reference potential Vo is applied to the column electrodes X1 to X4 in such a way that the application of the sustaining signals develops alternately positive and negative voltages at the terminals of the cells C1 to C16, for example voltages of 150 V that generate discharges in all the cells of the PP that are in the "ON" state. These discharges occur at each reversal of polarity of the sustaining square-wave signals, namely at each positive transition Tp and negative transition Tn of these signals.

The placing of the cells in the "ON" or "OFF" states is done by addressing operations that are managed by the image management device 3. They may consist for example of the superimposition of the specific signals of the addressing operation on the square waves of the sustaining signals. To this end, the row electrodes Y1 to Y4 are individualized, namely they are connected to an output circuit SY1 to SY4 proper to each of them, and each output circuit has, for example, a mixing circuit (not shown) by means of which it receives the sustaining signals and the addressing signals which come from different channels.

The sustaining signals have a period P that may be for example 10 microseconds, during which there are addressed all the cells belonging to a selected row L1 to L4, namely all the cells defined by means of a selected row electrode Y1 to Y4.

Assuming that, at an instant to, there starts the addressing of the first row L1 corresponding to the row electrode Y1, the addressing may be for example of a type such that, at this instant to, the signal applied to this electrode Y1 (and only to this electrode) is a negative erasure transition Tne, with a duration (shown in dashes) greater than that of the other transitions, that causes all the cells connected to this row electrode Y1 to be placed in the <<OFF>> state. Then, at an instant t1 when the signal has its positive plateau, a so-called recording square-wave signal C1 (shown in dashes) is superimposed (on the positive side) on this plateau. This recording square-wave signal has the effect of placing all the cells connected to this row electrode in the "ON" state except those whose column electrodes X1 to X4 deliver a so-called "masking" signal (not shown) which has the effect of inhibiting the effects of the recording square-wave signal CI.

This operation may be repeated at each of the following periods of the sustaining signals at the instants t2 and t3, t4 and t5, t6 and t7 at which the operations for addressing the rows L2, L3, L4 corresponding respectively to the row electrodes Y2, Y3, Y4 are thus made. At the instant t8, a new addressing of the first row L1 is carried out.

These addressing operations, performed successively for each row L1 to L4 of the screen, constitute a sub-scanning operation, and several sub-scanning operations are performed during an image cycle time or image period in order to obtain the half-tones of the image by placing the cells C1 to C16 of each row L1 to L4 in the "ON" state or the "OFF" state at each sub-scanning operation.

To this end, the image period PI is divided into n sub-periods S1, S2, . . . , Sn of different duration, respectively equal to To, 2To, . . . , $2^n-1$, To, with To=PI/$2^n-1$.

FIG. 3 illustrates the division of the image period PI into n sub-periods S1, S2, . . . , Sn with n equal to 4 in the example. The image period PI starts at the instant to with a first sub-period S1 that lasts for a period of time to and ends at an instant Ta. A second sub-period S2 starts at the instant ta and lasts for a period of time equal to 2To, ending at an instant tb at which a third sub-period S3 starts. The third sub-period S3 lasts for a period of time equal to 4To and ends at an instant tc. A fourth sub-period S4 starts at the instant tc and lasts for a period of time equal to 8To up to the end of the period PI which marks the instant to' of a following image period.

With an image period PI equal to 20 ms for example, the sub-periods S1, S2, S3, S4 respectively have a duration of the order of 1.33 ms, 2.66 ms, 5.33 ms and 10.66 ms.

Thus, in the example of FIG. 3, it is possible to address each row L1 to L4 four times during the image period of this row, at the instants to, ta, tb and tc. It is therefore possible, for each row L1 to L4, to place each cell C1 to C16 in the "OFF" state or the "ON" state at each of these instants, namely at each start of the sub-periods S1 to Sn, and each cell preserves this state up to the beginning of the next sub-period when it is again placed in either of the two states, namely the "OFF" state or the "ON" state.

The cells that have been placed in the "ON" state by the beginning of one or more sub-periods S1 to Sn are activated by the sustaining signals and produce light for the duration of this sub-period or these sub-periods. It is therefore possible, by the combination of the n sub-periods S to Sn, to obtain $2^n-1$ different periods of emission of light by each cell. Each period corresponds to a desired luminance level f or this cell during the image period PI. In addition, there is a period corresponding to the zero luminance level which corresponds to the case of a cell that is placed in the "OFF" state f or all the periods S1 to Sn of this image period.

Thus, in the example of FIG. 3, the luminance level of a cell placed in the "ON" state, namely a cell activated solely during the first sub-period S1, is ⅕th of the luminance level activated during the first and third sub-periods S1, S3 and 1/15th of the luminance level activated during the entire image period PI.

This principle of the control of the luminance levels of the cells of a row L1 to L4 can be applied to all the rows, of course with a time lag from one row to another. For example, the principle can be applied from a row L1 to the following row L2 with a lag that corresponds to a sustaining signal period p as shown in FIG. 2 which may, for example, be in the range of 10 microseconds. In fact, the image period PI has one and the same duration for all the rows L1 to L4, irrespective of the number N of these rows with a time lag for example of one period between two consecutive rows. This lag is seen again in the distribution of the sub-periods S1 to Sn.

It must be noted that the luminance levels desired for the different cells of each row L1 to L4 correspond to video input luminance values that are encoded and stored in the image management device 3, generally by means of n bits of different values of significance, each corresponding to one of the sub-periods S1 to Sn.

Since the cells C1 to C16 in the "ON" state are activated by the sustaining signals delivered by the row control device 1, they constitute a load applied to this device.

The sustaining signals may be prepared in different ways which are known per se. In any case, the row control device has at least one amplifier A for this purpose. This amplifier A delivers the sustaining signals to the output circuits SY1 to SY4 either directly as shown in FIG. 1 or by means of several output stages (not shown) each assigned to the supply of several output circuits, namely several row electrodes Y1 to Y4.

In the example of FIG. 1, only four row electrodes and four column electrodes are shown but a PP may actually have more than a thousand electrodes of each of these types, which define more than a million cells.

Consequently, the sustaining signals delivered by the amplifier A must be delivered by the amplifier at a current that may vary considerably as a function of the contents of the image, namely as a function of the number of cells which are in the "ON" state. Given the non-zero source impedance values of the amplifier A, as well as the impedance values of access to the cells (related in particular to the inductance and resistance values of the printed circuit tracks and the connections etc.), the quantity of charges really applied to a given cell C1 to C16 depends on the total content of the image. In other words, the greater the load applied to the amplifier A, the greater is the reduction in the luminance of the <<ON>> cells forming this load.

This variation of luminance as a function of the contents of the image can be seen especially in the case shown in FIG. 4 which represents an image that is formed chiefly by a low-luminance peripheral zone Z1 and a second high-luminance zone Z2 and has a constant encoding of video luminance value. A major variation of luminance displayed can be observed as a function of the variation of the surface area of the second zone Z2.

To this defect of the image, there is added another defect called an excess brightness defect. This defect consists especially of an exaggeration and even a reversal of the differences in luminance between zones. Here, reference is made again to FIG. 4, assuming that the second zone Z2 is formed by two contiguous surfaces R1, R2, the second one R2 of which is located at the center of the first one R1 and assuming that it is desired to display luminance values that are different but close to each other on these two surfaces, for example a luminance I2 corresponding to a video luminance encoding equal to 128 (in the case of a video luminance encoding on 8 bits, namely with eight sub-periods as explained here above), for the second surface R2 and a luminance I1 encoded 127 for the first surface R1.

An exaggeration and a reversal of the difference in luminance displayed by these two surfaces R1, R2 can be observed in the image: instead of a theoretical ratio I2/I1 of 1.008 (128/127=1.008), in fact a real ratio is obtained with a value that may be 0.54.

Furthermore, if the first surface R1 is made to vary, all else being equal, a variation is noted in the luminance values I1 and I2. This variation shows that the luminance I2 of the second surface R2 is dependent on the contents of the rest of the image outside this surface R2.

A known approach used to correct these defects consists in diminishing the impedance values of sources and the impedance values of connections, and the impedance values presented by the electrodes themselves. This is obtained by a choice and selection of the components and by drawing and preparing the paths of the discharging currents with special care and also by increasing the number of channels provided for the discharge currents (especially by the parallel connection of several power transistors at the sustaining signal amplifier or amplifiers, such as the amplifier A, as well as in the output circuits, such as the circuits SY1 to SY4).

However, the improvements that result therefrom are only partial and, at the same time, very costly for the number of components and/or their individual cost is greatly increased. There is also an increase in both space requirement and manufacturing complexity, and hence an increase in cost.

SUMMARY OF THE INVENTION

The present invention is aimed at limiting the variations of the luminance as a function of the contents of the image and at reducing or even eliminating the defects of excess brightness.

To this end, the invention proposes action on the load in a relatively simple and inexpensive way.

The invention relates to a method for the control of an image display screen, the pixels of which are cells arranged in rows and columns, the cells being placed either in a state known as an <<OFF>> state or in a state known as an <<ON>> state in which they are activated by signals delivered by a control device, the cells in the "ON" state producing light and constituting a load applied to the control device, the method consisting, for each row, as a function of a luminance level desired for each cell, in placing each cell in the "OFF" state or in the "ON" state during n successive sub-periods of different duration distributed according to a given cycle time, wherein said method furthermore consists in acting on the order of distribution of the sub-periods so as to reduce the variations of the load applied to the control device.

This makes it possible firstly to limit the load constituted by the activated cells and secondly to limit the variations in time of this load and therefore to act with particular efficiency on the defects of excess brightness which the authors of the present invention believe are due to a combination of the drop in luminance as a function of the load and a variation in time of this load.

The invention also relates to an image display device comprising cells arranged in rows and columns, the cells being placed either in a state known as an "OFF" state or in a state known as an <<ON>> state in which they are activated by signals delivered by a control device, the cells in the "ON" state producing light and constituting a load applied to the control device, the cells being placed in the "ON" state or in the "OFF" state during sub-periods of different duration applied to each row, the sub-periods being distributed successively under the control of an image management device, wherein the image management device comprises means to distribute the sub-periods between at least two consecutive rows of cells with different orders of distribution for each row.

BRIEF DESCRIPTION OF THE DRAWINGS

The invention will be understood more clearly from the following description, given by way of a non-restricted example, with reference to the appended drawings, of which:

FIGS. 2*a* to 2*e*, already described, illustrate the working of cells of a plasma panel;

FIGS. 5*a*, 5*b* each show a view in time of the variations of the load formed by a row of cells;

FIG. 5*c* gives a view in time of the variations of the load formed by a row of cells activated according to the method of the invention;

MORE DETAILED DESCRIPTION

Figure 4:
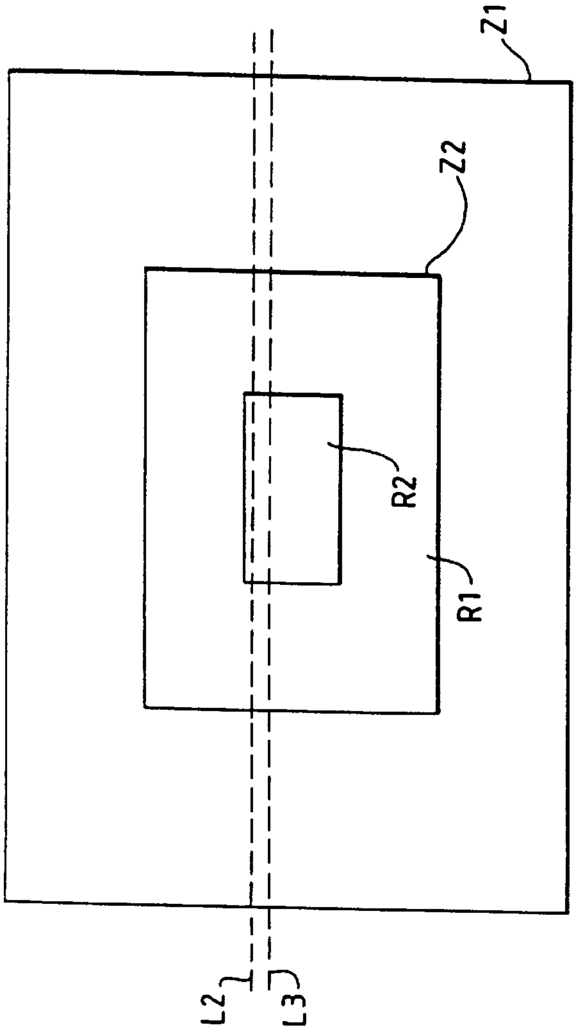
FIG.4 PRIOR ART
FIG. 4, already described, shows an image configuration revealing defects that the invention may reduce.

Taking for example the case of an image configuration such as that of FIG. 4, and assuming that:

a) the peripheral zone Z1 has a luminance equal to 0;

b) the first surface R1 has a luminance with a level 127;

c) the second surface R2 has a luminance with a level 128.

For two rows of cells that are close to each other or consecutive such as for example the second and the third row L2, L3 (already shown in FIG. 1), which both go into the peripheral zone Z1 and on the surfaces R1 and R2 (FIG. 4), a load Q formed by the "ON" state cells for each of these two rows L2, L3 is shown in FIGS. 5*a*, 5*b*.

Figure 2E:
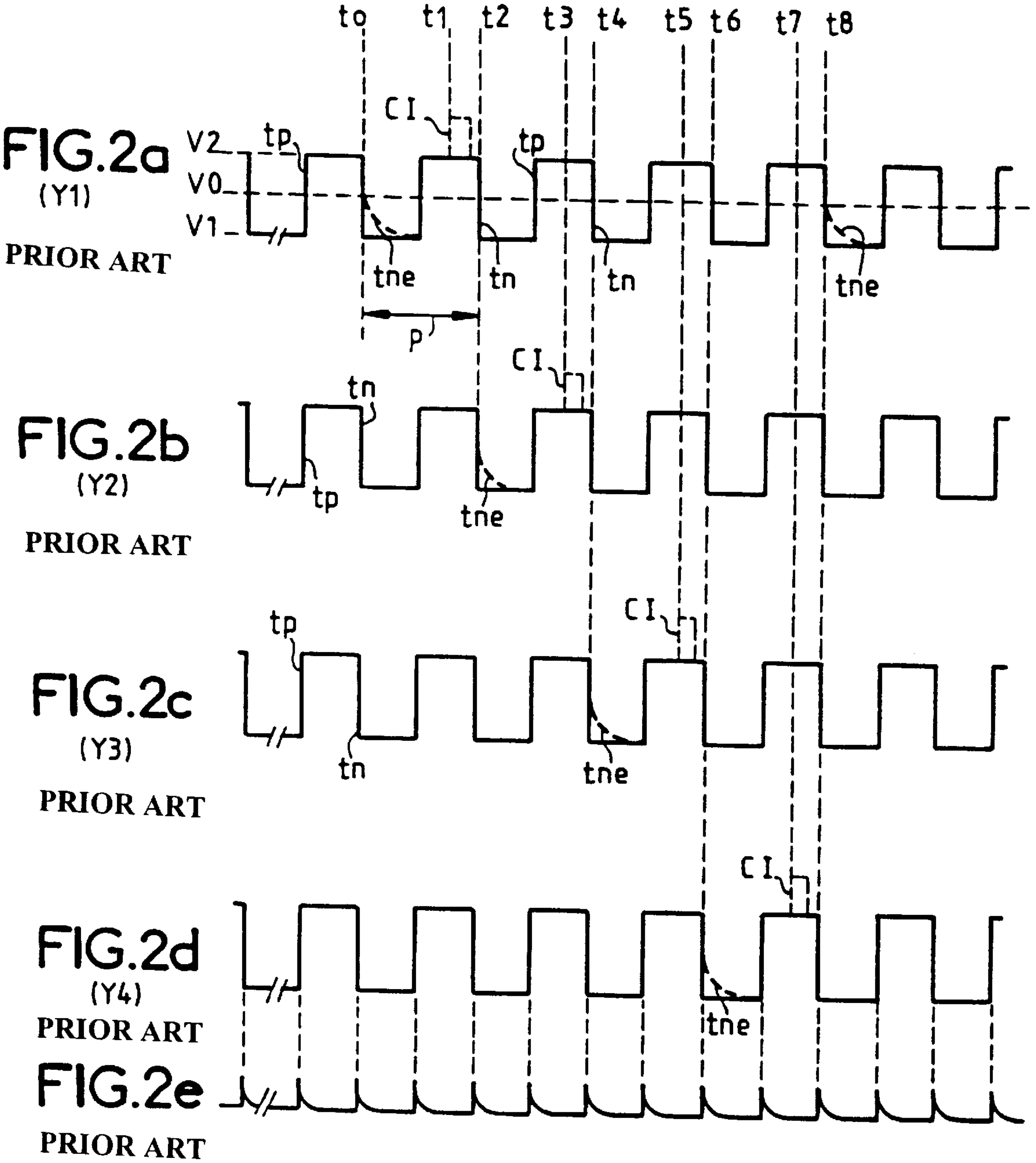
FIG.2e PRIOR ART
Figure 3:
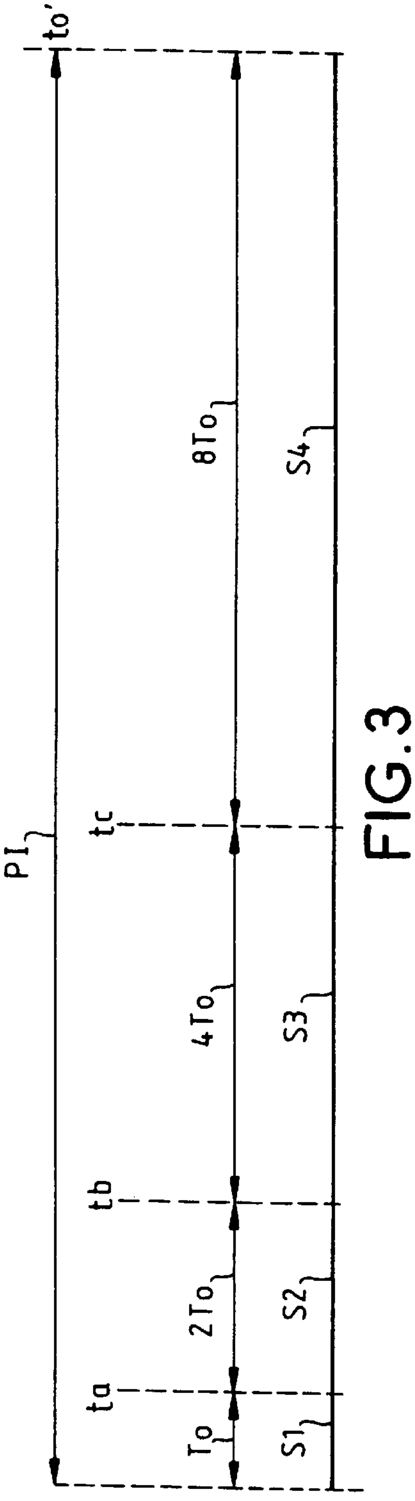
FIG.3 PRIOR ART
FIG. 3, already described, shows a division of an image period into n sub-periods.

FIG. 5*a* illustrates the variations in the load Q for the second row L2 in time and for the image configuration of FIG. 4 and FIG. 5*b* illustrates these variations for the third row L3. It must be noted that, in these two rows L2, L3, the load Q and its variations are the same, that the description of them made hereinafter can be applied therefore to both rows and that the time references are valid for these two rows. However, between these two rows there is a time difference corresponding to the time interval needed to carry out the addressing of two consecutive rows as already explained with reference to FIG. 2. This time interval which is for example in the range of 10 microseconds is therefore very small and insignificant as compared with that of an image period PI of 20 ms used to show the development of the load Q of the rows L2, L3.

At the instant to there starts the image period PI and with it the distribution of n sub-periods S to Sn with n=8 in the example, to obtain 256 luminance levels. The number of cells in the "ON" state is constant for the seven sub-periods S1 to S7 which succeed one another at the instants t1, t2, t3, t4, t5, t6 and the load Q therefore has a value Q1 that is constant up to the end of the seventh sub-period S7 at an instant t7. The sum (in terms of duration) of the sub-periods S1 to S7 defines the luminance level 127.

For cells that have to display levels of luminance equal to or greater than 127, they must be placed in the "ON" state during the eighth sub-period S8 while the cells that have to be in the "OFF" state are those having luminance levels lower than 128. Consequently, and given the example in which the number of cells encoded 128 is far greater than that of the cells encoded 127, the load Q undergoes a great increase and goes from the first value Q1 to a second value Q2 at the instant t7 at which the eighth sub-period S8 starts. Since this eighth sub-period S8 has a duration equal to half an image period, it ends at an instant tFP that marks the end of the image period PI.

The increase of the load Q of the rows L2, L3 results of course in an increase of the load applied to the row control device 1, and such an increase or variation of the load exists for all the rows of cells that define such images. These variations are added to one another in such a way that the total variation of the load may be considerable and may lead to the different image defects already referred to.

The method of the invention on the contrary tends to counter the variations in load of the two rows of cells that are near each other or consecutive like the rows L2, L3 and are therefore concerned by the same image configuration.

To this end, the method of the invention consists of the distribution of the n sub-periods S1 to Sn in a different order for the two rows of cells considered and therefore of the distribution, differently for these two rows, of the activation time of the cells within the image period PI.

It is possible for example, in the case of the two consecutive rows L2, L3:

for the second row L2, to keep the sequencing of the sub-periods S1 to S8, namely the order of their distribution, already described with reference to FIG. 5*a* which shows that sub-periods are distributed in the order of their increase in duration, and for the third row L3, to adopt a different sequencing such as one that constitutes, for example with respect to the second row L2, a partial reversal of the sequencing organized around a given luminance level, for example, a level corresponding to one of the n−1 cases where the luminance level corresponds to the activation by a single sub-period.

In the example given, where the major variation in load Q is produced for the luminance level 128, the sequencing of the sub-periods S1 to S8 may be such that, for the third row L3, it starts by the eighth sub-period S8 as shown in FIG. 5*c*.

FIG. 5*c* shows the variations of the load Q of the third row L3 in the course of an image period PI.

At the instant to, there starts the eighth sub-period S8 which ends substantially at the instant t7. Between to and t7, the load has the second value Q2. (It can be noted that, in the same time interval between to and t7, the load formed by the second row L2 has the first value Q1 which is lower, generated by the activation of the cells by the seven sub-periods S1 to S7.)

At the instant t7 (in FIG. 5*c*) the eighth sub-period S8 ends and there starts the sequence of the seven sub-periods S1 to S7. At the instant t7, it is also observed that the load formed by the third row L3 goes from the high value Q2 to the first value Q1 which is lower (unlike what happens at this instant for the second row L2, the load of which then goes from the first value Q1 to the second value Q2 which is higher).

The seventh sub-period S7 ends (for the third row L3) at the end of the image period PI, at the instant tFP when a new image period begins.

It can be seen that, for the example given, the difference in sequencing of the n sub-periods S1 to SN between two consecutive rows L2, L3 enables perfect compensation between two rows for the variations in load corresponding to luminance levels 127 and 128, for the sum of the loads constituted by these two rows preserves a constant value throughout the duration of an image period PI. A difference of this kind in the sequencing of the sub-periods S1 to SN between two consecutive rows L2, L3 therefore makes it possible to perfectly take the average of the restitution of the loads corresponding to the levels 127 and 128, and it tends to establish uniformity of the load for the luminance levels greater than 128.

It can be seen that by extending an approach of this kind to all the rows of a display screen, it is possible to considerably reduce the overall variations of the load and hence of the luminance as a function of this load.

Assuming that it is desired to obtain the uniformity or reduction of the overall load presented by two consecutive rows such as L2, L3 for luminance values other than the above, corresponding for example to the levels 63 and 64, the modification of the sequencing is of the same type:

it is possible, for one of the rows L2, L3 of cells, to preserve the traditional sequencing of the sub-periods S1 to S4 (illustrated for example in FIG. 5*a*), and for the other of these two rows, the distribution sequence of the sub-periods S1 to S8 is made to begin by the sub-period whose duration (by itself) represents the luminance level around which it is desired to carry out the load compensations.

In the case of the luminance level 64, this distribution sequence according to the invention must start with the seventh sub-period S7. It may be followed by the eighth sub-period S8 and then by the sub-periods S1 to S6.

The invention can also be applied to the processing, in the manner described here above, of two consecutive rows (for example the rows L1 and L2) to take the average of the total load with respect to a first luminance level, for example 128, and operate on two following consecutive rows (for example the rows L3 to L4) in order to act around a different luminance level, for example 64.

It is possible to extend this principle of compensation for the loads of several rows of cells to n−1 critical cases present in a system designed to process a video luminance value encoded on n bits.

The advantageous effect of compensation for the variations of the load of two consecutive rows may be obtained also with a sequencing of the partially inverted type for the two consecutive rows, provided that it is different, between these two rows, for example organized by a reversal on the basis of 64 (S7) for one and on the basis of 128 (S8) for the other.

Figure 1:
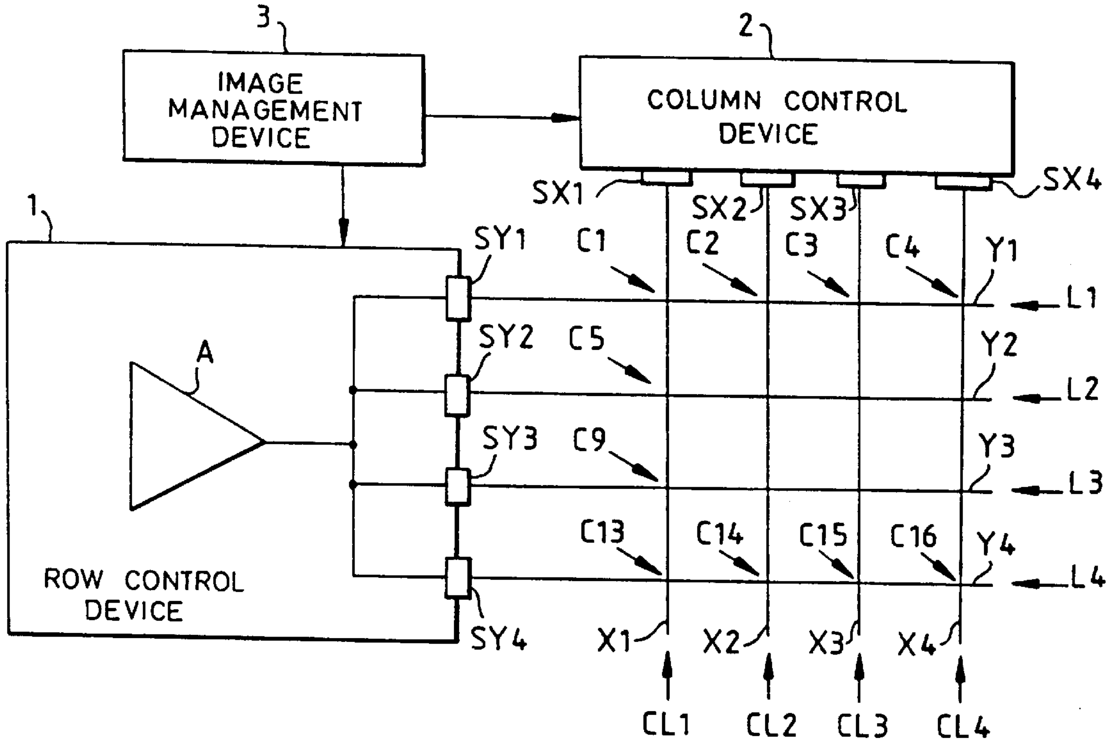
FIG.1 PRIOR ART
FIG. 1, already described, represents a plasma panel.

The means needed to implement the method of the invention already exist essentially, with most of the image management devices such as the one shown in FIG. 1 used to activate a display screen.

Figure 6:
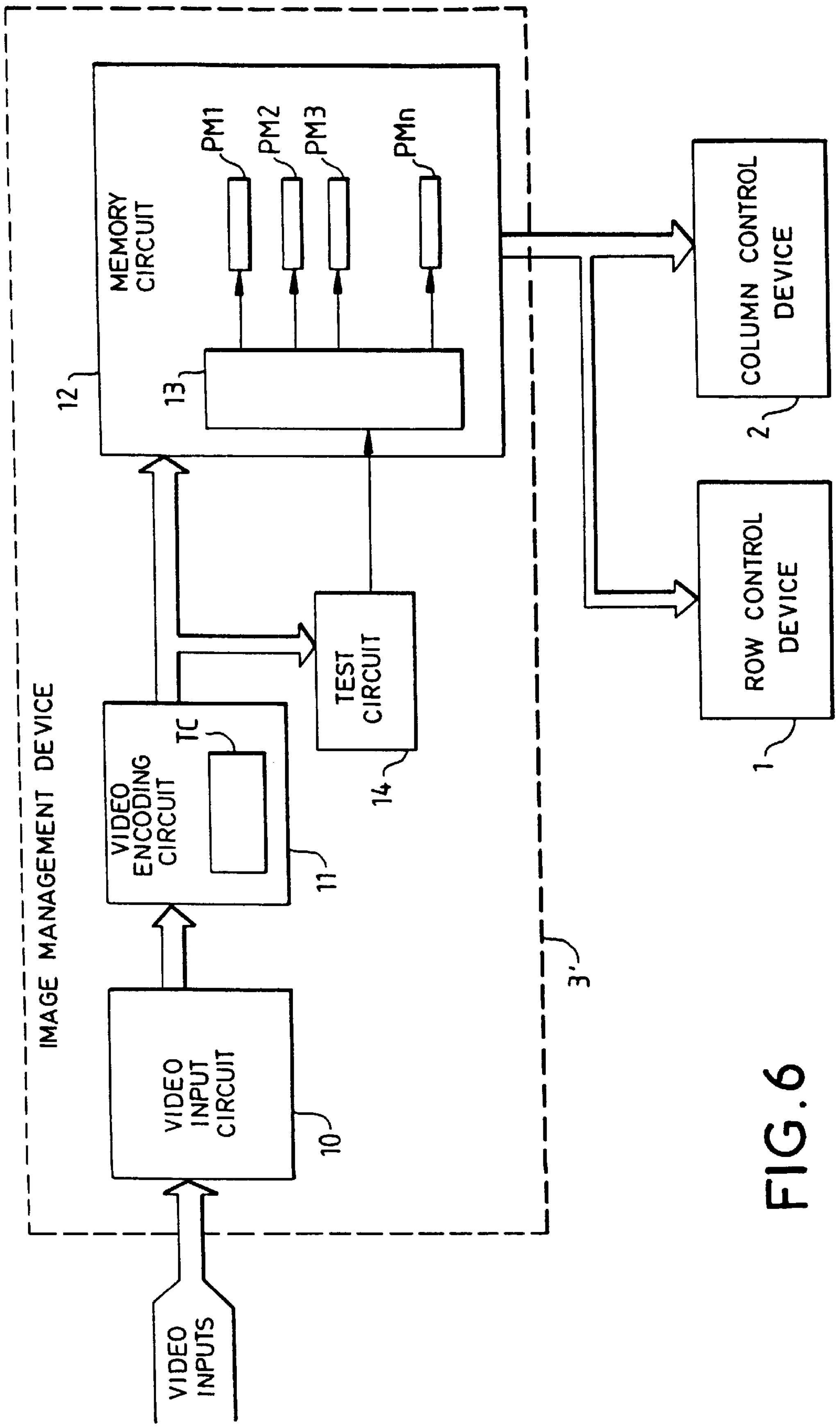
FIG. 6 gives a schematic view of an exemplary embodiment of an image management device enabling the implementation of the method of the invention.

FIG. 6 gives a schematic view, by means of functional blocks, of certain functions known per se that are carried out by a plasma panel image management device 3.

It has for example a video input circuit 10 that carries out a matching of video signals and classifies them for example for each row of cells as a function of the luminance to be displayed for each cell.

The video input circuit 10 delivers video data elements that are applied to a video encoding circuit 11. This circuit may comprise for example an encoding table TC by means of which it defines the different sub-periods Sl to Sn during which each cell of a given row must be activated for an image period PI to restore the desired luminance level.

The video encoding circuit 11 delivers encoded data elements to the memory circuit 12 which may comprise for example as many memory arrays PM1, PM2, . . . , PMn as there are sub-periods S1 to Sn. To each sub-period S1 to Sn there may thus correspond a memory array in which, for each row L1 to L4, there are memorized the addresses of the cells C1 to C16 which must be placed in the "ON" state.

The memory circuit 12, by the exchange of information with the row and column control devices 1, 2 (shown in FIG. 1), determines the placing of the different cells of each row in the "ON" state or "OFF" state at the beginning of each of the sub-periods S1 to Sn that are distributed for each row within an image period PI.

The memory circuit 12, for this purpose, may comprise a sequencer circuit 13 connected to each of the memory arrays PM1 to PMn which, for each row, may then determine the order of distribution of the sub-periods S1 to Sn so that, for a given row, this distribution takes place according to a simple sequencing, such as for example the conventional mode shown in FIG. 5*a* and so that, for the next row, it works according to the so-called reverse sequencing mode shown in FIG. 5*c*. This can be obtained in a simple way, for example by a programming of the sequencer 13 so as to alternate a simple sequencing and a reverse sequencing.

However it is also possible to control the order of distribution of the sub-periods S1 to Sn by the detection, for at least one row, of one or more major imbalances in the development of the number of cells that had to be placed in the "ON" state during an image period PI. This may be detected for example by the video encoding circuit 11 by means of a test circuit 14 using the data elements present in the encoding table TC, to transmit a decision to the sequencer 13.

The above explanations pertaining to the working of an image management device are given as a non-restrictive example. Various other methods, all within the scope of the specialist, can be used for the modification, from one row to another, of the sequencing of the n sub-periods S1 to Sn routinely or else as a function of tests.

What is claimed is:

1. A method of controlling an image display screen which has a plurality of cells arranged in rows, each of the cells being in an ON state or an OFF state, the method comprising:

supplying activation signals to the plurality of cells to change selectively a state of the cells;

applying a load caused by the cells that are in the ON state to a control device;

switching the state of each of the cells during n successive sub-periods of different durations distributed according to a predetermined cycle time;

rearranging distribution order of the sub-periods; and compensating at least for a variation of the load caused by the cells of one row based upon varying the load of another row in accordance with the rearranging step.

2. A method according to claim 1, wherein the compensating step comprises varying the load of another row which is consecutive to said one row.

3. A method according to claim 1, wherein the step of switching comprises distributing the sub-periods in a different order between the one row and the other row.

4. A method according to claim 1, wherein the n sub-periods are of different durations, the durations respectively increasing in a ratio of 2 to provide $2^n-1$ combinations of periods, each of the combinations corresponding to a possible luminance level of the cells.

5. A method according to claim 1, further comprising starting the distribution of the sub-periods with the sub-period whose duration corresponds to a luminance level associated with the variation of the load.

6. A method according to claim 1, wherein the distribution of the sub-periods is based upon rising order of duration.

7. A method according to claim 1, wherein the distribution of the sub-periods is different from a distribution based upon increasing duration of the sub-period.

8. A method according to claim 5, wherein the rows comprise at least two groups of two consecutive rows, and said switching step comprises distributing the sub-periods in a different order for respective rows of the two groups such that load compensation is centered on a different luminance level in each group.

9. A method according to claim 1, wherein the display screen is an alternating plasma panel.

10. An image display device comprising:

a plurality of cells arranged in a first row and a second row, each of the cells being in an ON state or an OFF state;

a control device configured to deliver selectively and independently signals to the cells in the first row and the second row to activate the cells during sub-periods of different durations, the control device receiving a load caused by the cells in the ON state; and an image management device configured to control successive distribution of the sub-periods associated with the first row and the second row, wherein a distribution order associated with the first row is different from a distribution order associated with the second row, the image management device changing the distribution order associated with the second row to compensate at least for a load variation in the first row.

11. A display device according to claim 10, wherein the image management device comprises an image sequencer circuit used to control the distribution of the sub-periods according to at least two different orders of distribution.

12. A display device according to claim 11, wherein the image management device further comprises a test circuit cooperating with the sequencer circuit to define the order of distribution of the sub-periods.

13. A display device according to one of the claims 10, 11, or 12, wherein the display device is a plasma panel.

14. A display device according to claim 13, wherein the plasma panel is of the alternating type.

* * * * *